US012778117B2

(12) United States Patent
Ummidi et al.

(10) Patent No.: US 12,778,117 B2
(45) Date of Patent: Nov. 3, 2026

(54) ESSENTIAL OIL COMPOSITION

(71) Applicant: PEELON, INC., Visakhapatnam (IN)

(72) Inventors: Venkata Ravi Sankar Ummidi, Ramchandrapuram (IN); Taraka Ramji Moturu, Brussels (BE)

(73) Assignee: PEELON, INC., Visakhapatnam (IN)

( * ) Notice: Subject to any disclaimer, the term of this patent is extended or adjusted under 35 U.S.C. 154(b) by 182 days.

(21) Appl. No.: 18/589,367

(22) Filed: Feb. 27, 2024

(65) Prior Publication Data

US 2025/0268247 A1 Aug. 28, 2025

(51) Int. Cl.

| | |
|---|---|
| ***A01N 25/08*** | (2006.01) |
| ***A01N 27/00*** | (2006.01) |
| ***A01N 31/02*** | (2006.01) |
| ***A01N 31/08*** | (2006.01) |
| ***A01N 31/16*** | (2006.01) |
| ***A01N 35/02*** | (2006.01) |

(52) U.S. Cl.

CPC ............. *A01N 25/08* (2013.01); *A01N 27/00* (2013.01); *A01N 31/02* (2013.01); *A01N 31/08* (2013.01); *A01N 31/16* (2013.01); *A01N 35/02* (2013.01)

(58) Field of Classification Search

None

See application file for complete search history.

(56) References Cited

FOREIGN PATENT DOCUMENTS

| | | | | |
|---|---|---|---|---|
| CN | 113439753 A | * 9/2021 | ............. | A01N 65/36 |
| JP | 2009242279 A | * 10/2009 | | |

OTHER PUBLICATIONS

Sujani, B., et al., A facile method to modify bentonite nanoclay with silane, Int Nano Lett (2017) 7:237-241 (Year: 2017).*

Castro, K., et al., Acaricidal activity of cashew nut shell liquid associated with essential oils from Cordia verbenacea and Psidium guajava on Rhipicephalus microplus, Journal of Essential Oil Research (2019) available at https://doi.org/10.1080/10412905.2019.1580225 (Year: 2019).*

Fukushi, K., et al., Desorption of Intrinsic Cesium from Smectite: Inhibitive Effects of Clay Particle Organization on Cesium Desorption, Environ. Sci. Technol. 2014, 48, 10743-10749 (2014) (Year: 2014).*

Tachi, Y., et al., Diffusion and sorption of Cs+, Na+, I and HTO in compacted sodium montmorillonite as a function of porewater salinity: Integrated sorption and diffusion model, Geochimica et Cosmochimica Acta 132 (2014) 75-93 (Year: 2014).*

CN 113439753A Machine translation, Description (Year: 2026).*

JP 2009242279 A Machine translation, Description (Year: 2026).*

Wang, L. et al., Molecular dynamics simulation on the thermodynamic properties of insulating paper cellulose modified by silane coupling agent grafted nano-SiO2, AIP Advances 9, 125134 (2019) (Year: 2019).*

Giannakas A., Tsagkalias I., Achilias D. S. & Ladavos A.,—A novel method for the preparation of inorganic and organo-modified montmorillonite essential oil hybrids—Jun. 18, 2017, 9 pages. Elsevier, Greece. Contents lists available at ScienceDirect, Applied Clay Science, journal homepage: www.elsevier.com/locate/clay. Laboratory of Food Technology, Department of Business Administration of Food and Agricultural Enterprises, University of Patras, G. Seferi 2, 30100 Agrinio, Greece et al.

Saucedo-Zuniga J., N. Sanchez-Valdes S et al.—"Controlled release of essential oils using laminar nanoclay and porous halloysite / essential oil composites in a multilayer film reservoir"—Jan. 14, 2021, 10 pages. Elsevier, Greece. Contents lists available at ScienceDirect, Microporous and Mesoporous Materials, journal homepage: http://www.elsevier.com/locate/micromeso. Centro de Investigaci'on en Química Aplicada, Saltillo, Coahuila, 25294, Mexico et al.

Kamal Essifi, Abdourahim Hammani et. al.—"Montmorillonite nanoclay based formulation for controlled and selective release of volatile essential oil compounds"—Feb. 1, 2022, 24 pages. Physical Chemistry of Natural Substances and Process Team, Laboratory of Applied Chemistry and Environment (LCAE-CPSUNAP), Department of Chemistry, Faculty of Sciences, University Mohamed Premier, Oujda, Morocco et al.

Adriana J. Santos, Licia T. S. Pina et al. "Clay/PVP nanocomposites enriched with Syzygium aromaticum essential oil as a safe formulation against Aedes aegypti larvae"—Feb. 2020, 7 pages. Elsevier, Brazil. Postgraduate Program in Pharmaceutical Sciences, Federal University of Sergipe, São Cristóvão, SE, Brazil Pharmacy Department, Federal University of Sergipe, São Cristóvão, SE, Brazil Physics Department, Federal University of Sergipe, São Cristóvão, SE, Brazil et al.

Patricia Melchionna Albuquerque et al. "Biotechnological Applications of Nanoencapsulated Essential Oils"—Dec 15, 2022, 27 pages. Polymers. Research Group on Chemistry Applied to Technology (QAT), School of Technology, Amazonas State University, Manaus 69050-020, Brazil et al.

U.S. Appl. No. 18/589,405, filed Feb. 27, 2024 in the name of Venkata Ravi Sankar Ummidi.

* cited by examiner

*Primary Examiner* — H. Sarah Park

(74) *Attorney, Agent, or Firm* — MARSHALL, GERSTEIN & BORUN LLP; Michael P. Furmanek

(57) ABSTRACT

An essential oil composition and a process for preparing the same is disclosed. The essential oil comprising one or more essential oils, or an extract thereof homogenized with a silane modified clay. The silane modified clay comprises a clay having hydroxyl group present thereon bonded with a silane coupling agent having a chemical formula I:

$$R—(CH_2)n—(Si)—X_3$$

wherein:

R is selected from the group consisting of acryloxy, amine, or glycidyl ether, n is 2-4; and each X is independently selected from the group consisting of $CH_3$, $C_2H_5$, $OCH_3$, and $OC_2H_5$.

16 Claims, 6 Drawing Sheets

ESSENTIAL OIL COMPOSITION

FIELD OF INVENTION

The present disclosure relates to an essential oil composition. In particular, the present disclosure relates to the essential oil composition comprising one or more essential oils or an extract thereof homogenized with a silane modified clay, and a process for preparing said composition.

BACKGROUND

Essential oils are known to exhibit antioxidant, antibacterial, antiparasitic, antifungal, antipathogenic, and/or anticancer activity, which makes them suitable for various applications, including, inter alia, the food, cosmetic, and pharmaceutical industries. However, the industrial application of the essential oils is still challenging as the essential oils are highly volatile and get easily degraded upon oxidation through direct exposure to light, heat, oxygen, and humidity. To enhance their stability, activity, and bioavailability, it is known to form nanocarriers for essential oils. However, the existing systems suffer from one or more disadvantages, such as degradation, high solubility, and reduced bioavailability of essential oils; scalability; and economic viability of the process for preparing the nanocarriers.

SUMMARY

An essential oil composition is disclosed. The essential oil composition comprises one or more essential oils or an extract thereof homogenized with a silane modified clay. The silane modified clay comprises a clay having hydroxyl group present thereon bonded with a silane coupling agent having a chemical formula I:

$$R—(CH_2)_n—(Si)—X_3 \quad (I)$$

wherein:

R is selected from the group consisting of acryloxy, amine, and glycidyl ether;

n is 2-4; and each X is independently selected from the group consisting of $CH_3$, $C_2H_5$, $OCH_3$, and $OC_2H_5$.

A process for preparing said essential oil composition is also disclosed. The disclosed process comprises the steps of preparing an aqueous dispersion of clay; adding a silane coupling agent to the aqueous dispersion of clay at a temperature in the range of 60-80° C. to obtain a silane modified clay; preparing an aqueous slurry of the silane modified clay; adjusting the pH of the aqueous slurry of the silane modified clay in the range of 9-11; blending one or more essential oils or an extract thereof with the aqueous slurry of the silane modified clay to obtain a mixture of the one or more essentials or an extract thereof and the silane modified clay. This mixture of the one or more essential oils or an extract thereof and the silane modified clay is subjected to drying such that the composition comprising one or more essential oils or an extract thereof homogenized with the silane modified clay is obtained.

DETAILED DESCRIPTION

Figure 1A:
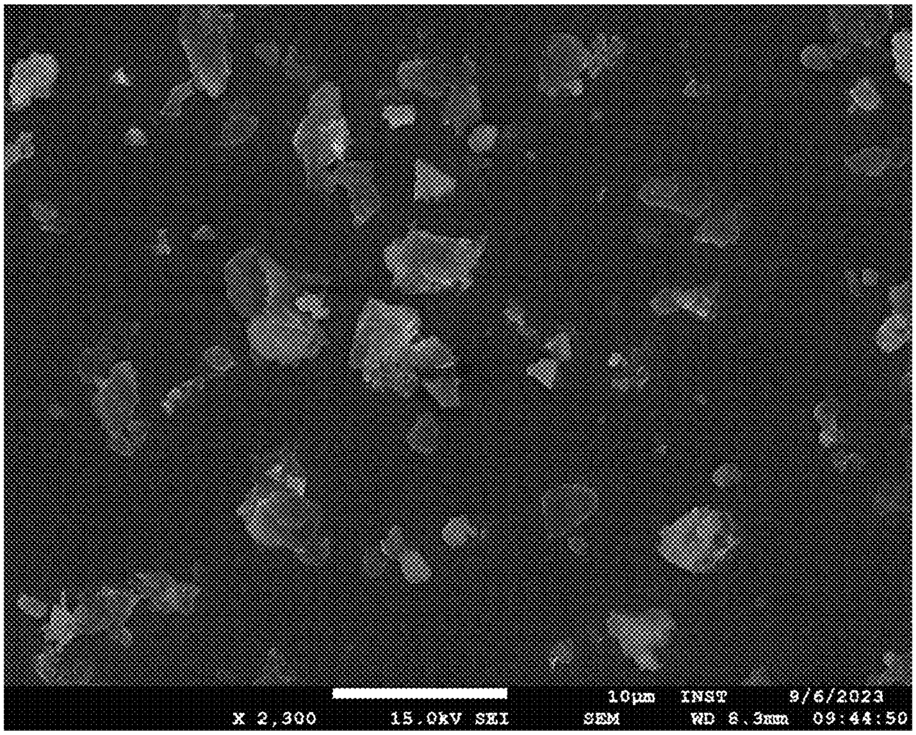
FIG. 1A depicts the Scanning Electron Microscope (SEM) image of the bentonite clay in accordance with an embodiment of the present disclosure.

To promote an understanding of the principles of the disclosure, reference will now be made to embodiments and specific language will be used to describe the same. It will nevertheless be understood that no limitation of the scope of the disclosure is thereby intended, such alterations and further modifications in the disclosed composition and process, and such further applications of the principles of the disclosure therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof.

Reference throughout this specification to "one embodiment" "an embodiment" or similar language means that a particular feature, structure, or characteristic described in connection with the embodiment is included in at least one embodiment of the present disclosure. Thus, appearances of the phrase "in one embodiment", "in an embodiment" and similar language throughout this specification may, but do not necessarily, all refer to the same embodiment.

Essential oils are concentrated hydrophobic liquids containing volatile compounds obtained from the fruit, seeds, flowers, bark, stems, roots, leaves or other parts of plants. The term "essential oil" as used herein refers to essential oil as a whole or the specific compound(s) extracted from the essential oil.

In the broadest scope, the present disclosure relates to an essential oil composition. Specifically, the essential oil composition comprises one or more essential oils or an extract thereof homogenized with a silane modified clay. The silane modified clay comprises a clay having hydroxyl group present thereon bonded with a silane coupling agent having a chemical formula I:

$$R—(CH_2)_n—(Si)—X_3 \quad (I)$$

wherein:

R is selected from the group consisting of acryloxy, amine, and glycidyl ether;

n is 2-4; and each X is independently selected from the group consisting of $CH_3$, $C_2H_5$, $OCH_3$, and $OC_2H_5$.

In an embodiment, the disclosed essential oil composition comprises the one or more essential oils or the extract thereof homogenized with the silane modified clay in a weight ratio in the range of 1:5 to 2:5. In some embodiments, the disclosed composition comprises the one or more essential oils or the extract thereof homogenized with the silane modified clay in the weight ratio of 1:5.

In an embodiment, the homogenization includes encapsulation. In an embodiment, the encapsulation includes microencapsulation to form microspheres comprising one or more essential oils or extract thereof encapsulated with the silane modified clay. In an embodiment, the microspheres of the essential oil composition have an average particle size ($D_{50}$) in the range of 0.5-5 μm. In some embodiments, the microspheres have the average particle size ($D_{50}$) of 3 μm. In an embodiment, the essential oil composition has a tapped density in a range of 1.016 g/cm$^3$-1.035 g/cm$^3$.

In the disclosed essential oil composition, the silane modified clay interacts with the one or more essential oils or the extract thereof to form a network of non-covalent bonds (hydrogen bonds), such that the one or more essential oils or extracts thereof is encapsulated within the matrix of the silane modified clay. This provides for slow and sustained release of the one or more essential oils or extracts thereof from the essential oil composition.

In an embodiment, the silane modified clay comprises the clay and the silane coupling agent in a w/w ratio ranging between 10:0.1 to 10:1. In some embodiments, the silane modified clay comprises the clay and the silane coupling agent in the w/w ratio of 10:0.2.

In an embodiment, the silane coupling agent of Formula (I) is selected from the group consisting of (3-Aminopropyl) triethoxysilane, epoxy silanes and methacryloxy propyl trimethoxy silane. In some embodiments, the silane coupling agent of Formula (I) is (3-Aminopropyl) triethoxysilane.

In an embodiment, the one or more essential oils includes but are not limited to angelica oil, anise oil, basil oil, bay oil, bergamot oil, bois de rose oil, calendula oil, cananga oil, caraway oil, cardamom oil, cedar oil, cedarwood oil, *Chamaecyparis obtusa* oil, chamomile oil, cinnamon oil, citronella oil, clary sage oil, clove oil, copaiba balsam oil, coriander oil, cumin oil, dill oil, eucalyptus oil, fennel oil, garlic oil, geranium oil, ginger oil, grapefruit oil, guaiacwood oil, hiba oil, camphor oil, iris oil, Japanese mint oil, jasmine oil, lavender oil, laurel leaf oil, lemon oil, lemongrass oil, lime oil, linaloe oil, lindera oil, mandarin oil, mustard oil, neroli oil, onion oil, orange oil, oregano oil, palmarosa oil, parsley oil, patchouli oil, peach kernel oil, pennyroyal oil, pepper oil, peppermint oil, perilla oil, Peru balsam oil, petitgrain oil, pine needle oil, rose oil, rosemary oil, sandalwood oil, spearmint oil, star anis oil, tagetes oil, tea tree oil, tea seed oil, thyme oil, tolu balsam oil, tuberose oil, meric oil, vetivert oil, western mint oil, white micromeria oil, wintergreen oil or any combination thereof.

In an embodiment, the extract of the one or more essential oils includes one or more class of compounds selected from the group consisting of aromatic compounds, terpenes and terpenoids, aldehydes, esters, and their derivatives. In an embodiment, aromatic compounds include phenols, and phenylpropenes. In an embodiment, phenylpropenes and their derivatives include anethole, myristicin, estragole, apiole, cinnamaldehyde, safrole and cuminal. In an embodiment, phenols and their derivatives include cardonol triene, carvacrol, thymol, cardanol acetate, eugenol, and isoeugenol. in an embodiment, terpenes include acyclic, monocyclic, bicyclic, and tricyclic monoterpenes as well as acyclic, monocyclic, and bicyclic sesquiterpenes. The terpenes and terpenoids include menthone, d-limonene, ocimene, sabinene, 3-carene, linalool, (−) trans-caryophyllene, citral, α-phellandrene, terpinolene, eucalyptol, thujone, camphene, α-pinene, β-pinene, nerol, menthol, β-damascenone, geraniol, myrcene, citronellal, citronellol, tricyclene, fenchone, farnesene, chamazulene, nerolidol, farnisol, germacrene d, bisabolene, selinene, patchoulene, valencene, cyperol, eudesmol, camphor, nootkatone, aromadederene, aromadederene oxide, borneol, carvone, bisabolol. In some embodiments, the extract of one or more essential oils is selected from the group consisting of eugenol, cinnamaldehyde, D-limonene, linalool, beta-caryophyllene, cardanol acetate and combinations thereof. In an embodiment, the extract of the one or more essential oils comprises eugenol in a range of 40-60% w/w, cinnamaldehyde in a range of 10-20% w/w, D-limonene in a range of 5-20% w/w, linalool in a range of 5-20% w/w, beta-caryophyllene in a range of 5-20% w/w, and cardanol acetate in a range of 5-20% w/w. In some embodiments, the extract of the one or more essential oils comprises 50% w/w eugenol, 20% w/w cinnamaldehyde, 15% w/w D-limonene, 5% w/w linalool, 5% w/w beta-caryophyllene, and 5% w/w cardanol acetate. The one or more essential oils and the extract thereof used in the disclosed composition were obtained from commercial sources in the US.

In an embodiment, the clay is selected from the group consisting of montmorillonite (MMT), bentonite clay, kaolinite, dickite, amesite, lizardite, smectite, palygorskite, sepiolite, glauconite, mica, vermiculite, saponite halloysite, hectorite and combinations thereof. In some embodiments, the clay is bentonite clay. The bentonite clay includes one or more of sodium bentonite, and calcium bentonite clay. In an embodiment, the bentonite clay has an average particle size in the range of 1-10 μm. In some embodiments, the bentonite clay has the average particle size in the range of 7 μm. In an embodiment, the bentonite clay has a mass density in the range of 1.2-1.8 g/cm$^3$. In some embodiments, the bentonite clay has the mass density in the range of 1.5 g/cm$^3$. In an embodiment, the bentonite clay has a cation exchange capacity (CEC) in the range of 60 to 150 meq/100 g. In some embodiments, the bentonite clay has the CEC of 120 meq/100 g.

In an embodiment, bentonite clay is purified bentonite clay. The purified bentonite clay as used in the present disclosure with its fine particle size ensures a large surface area for maximum oil retention and is highly effective for oil encapsulation. The purified bentonite clay with the mass density as recited above contributes to the stability of the encapsulated essential oil composition and maintains its integrity during storage for long time. The high cation exchange capacity of the purified bentonite clay enables controlled and slow release of the essential oil from the essential oil composition.

The above-mentioned properties make the disclosed composition ideal for applications requiring sustained oil delivery, such as an in pharmaceutical products and agrochemical products.

In an embodiment, the essential oil composition is a standalone composition. In an alternate embodiment, the essential oil composition is added to a substrate. In an embodiment, the substrate is a natural or a synthetic polymeric composition, woven or non-woven fabric, paper and the like. In an embodiment, natural polymer includes cellulose, starch, xanthan gum, gellan gum and acacia gum etc. In an embodiment, synthetic polymer includes polybutylene adipate terephthalate (PBAT), polylactic acid (PLA), phosphate buffered saline (PBS), and polyhydroxyalkanoates (PHA). When added to a substrate, the composition further comprises of a compatibilizer. The compatibilizer is selected from the group consisting of amines, aldehydes, $CaCO_3$, nano fillers, glycerol, synthetic polymers, natural polymers and combinations thereof.

In some embodiments, the compatibilizer is PEG 200-600, glycerol, maleic anhydride and glycerol triacetate.

In an embodiment, the essential oil composition further comprises additives. Said additives include one or more of preservatives, colourants, flavouring substances, antimicrobial agents, and bio-active compounds as is now known or developed in the future.

A process for preparing the essential oil composition is also disclosed. Said process comprises the steps of:

a. preparing an aqueous dispersion of clay;
b. adding a silane coupling agent to the aqueous dispersion of clay at a temperature in the range of 60-80° C. to obtain a silane modified clay;
c. preparing an aqueous slurry of the silane modified clay;
d. adjusting the pH of the aqueous slurry of the silane modified clay in the range of 9-11;
e. blending one or more essential oils or an extract thereof with the aqueous slurry of the silane modified clay to obtain a mixture of the one or more essential oils or an extract thereof and the silane modified clay; and
f. drying the mixture of the one or more essential oils or an extract thereof and the silane modified clay obtained in step e) such that the composition comprising the one or more essential oils or an extract thereof homogenized with the silane modified clay is obtained.

In an embodiment, prior to the preparation of the aqueous dispersion of the clay, the clay is subjected to a purification step. In the purification step, the clay is heated at an elevated temperature in a range of 200° C.-250° C. for a time period in the range of 3-5 hours. In the next step, the heated clay is mixed with water to obtain a suspension of clay. In an embodiment, the heated clay is mixed with water in a w/w ratio in a range of 1:1 to 1:5 to obtain the suspension of clay. In some embodiments, the heated clay is mixed with water in a w/w ratio of 1:2 to obtain the suspension of clay. In an embodiment, the suspension of the clay is allowed to separate into a sediment of clay and an aqueous layer. After the settling of the suspension of clay, the aqueous layer is decanted, followed by the addition of an acid to the sediment of clay. In an embodiment, the acid is added to the sediment of clay at a temperature in a range of 25-30° C. with constant stirring to obtain purified clay. In an embodiment, the sediment of clay is stirred at a stirring rate in the range of 2000-4000 rpm for a time period in the range of 20 to 60 minutes to obtain the purified clay. In some embodiments, the sediment of clay is stirred at 3000 rpm for 30 minutes to obtain the purified clay. In an embodiment, the acid is selected from the group consisting of hydrochloric acid, sulfuric acid, nitric acid and citric acid. In some embodiments, the acid is hydrochloric acid. In an embodiment, the acid is added in an amount in the range of 0.1:1 to 0.5:1 w/w to the sediment of clay.

In the next step, the obtained purified clay is dried at a temperature in the range of 170-220° C. for a time period in the range of 4-8 hours. In some embodiments, the purified clay is dried at 200° C. for 6 hours. The drying method includes any method known to a person skilled in the art for drying of clay. Examples of suitable method include but are not limited to spray drying, hot air oven drying and tray drying.

In an embodiment, the clay is selected from the group consisting of montmorillonite (MMT), bentonite clay, kaolinite, dickite, amesite, lizardite, smectite, palygorskite, sepiolite, glauconite, mica, vermiculite, saponite halloysite and hectorite. In some embodiments, the clay is bentonite clay. The bentonite clay includes one or more of sodium bentonite, and calcium bentonite clay. In an embodiment, the bentonite clay has an average particle size in the range of 1-10 μm. In some embodiments, the bentonite clay has an average particle size in the range of 7 μm. In an embodiment, the bentonite clay has a mass density in the range of 1.2-1.8 g/cm3. In some embodiments, the bentonite clay has the mass density in the range of 1.5 g/cm3. In an embodiment, the bentonite clay has a CEC in the range of 60 to 150 meq/100 g. In some embodiments, the bentonite clay has the CEC in the range of 120 meq/100 g.

After the purification of clay, the aqueous dispersion of clay is prepared. In an embodiment, the aqueous dispersion of the clay is prepared by mixing the purified clay and water in a w/w ratio ranging between 1:1 to 1:5 for a time-period ranging between 1-2 hours. In some embodiments, the purified clay and water are mixed in the w/w ratio of 1:2.5. In an embodiment, the purified clay and water are mixed at a temperature ranging between 50-80° C. under continuous stirring at a stirring rate of 2000-4000 rpm.

In the next step, the silane coupling agent is added to the aqueous dispersion of the clay to obtain the silane modified clay. In an embodiment, the silane coupling agent is added to the aqueous dispersion of clay in a w/w ratio ranging between 0.1:10 to 0.5:10 to obtain the silane modified clay. The addition of the silane coupling agent to the aqueous dispersion of the clay is performed under constant stirring. In an embodiment, the stirring is carried out at a stirring rate in a range of 2000 to 4000 rpm. In some embodiments, the stirring is carried out at 3500 rpm. In an embodiment, the stirring is carried out for a time period in a range of 90 to 180 minutes. In some embodiments, the stirring is carried out for 120 minutes to obtain the silane modified clay.

In an embodiment, the silane modified clay comprises the clay having hydroxyl group present thereon bonded with the silane coupling agent having a chemical formula I:

$$R—(CH_2)_n—(Si)—X_3$$

wherein:

R is selected from the group consisting of acryloxy, amine, or glycidyl ether;

n is 2-4; and each X is independently selected from the group consisting of $CH_3$, $C_2H_5$, $OCH_3$, and $OC_2H_5$.

In an embodiment, the silane coupling agent of Formula (I) is selected from the group consisting of (3-Aminopropyl) triethoxysilane, epoxy silanes and methacryloxy propyl trimethoxy silane. In some embodiments, the silane coupling agent of Formula (I) is (3-Aminopropyl) triethoxysilane.

In the next step, the obtained silane modified clay is subjected to washing. The silane modified clay is washed at least three times using water till excess silane coupling agent is completely removed. Washing assists in removing the impurities and excess silane coupling agent.

The obtained silane modified clay is filtered and then subjected to drying using a drying technique now known or developed in the future. In an embodiment, the filtered silane modified clay is subjected to drying at a temperature ranging from 100-250° C. In some embodiments, the filtered silane modified clay is dried at 100° C. In an embodiment, the drying is carried out till the moisture of the silane modified clay is less than 1% as detected by the loss in weight method at 100° C.

The obtained dried silane modified clay is used to prepare the aqueous slurry of the silane modified clay. In an embodiment, the dried silane modified clay is mixed with water in a w/w ratio ranging from 1:1 to 1:5 under continuous stirring to obtain the aqueous slurry of the silane modified clay. In an embodiment, the stirring is done at a rate ranging between 2000 to 4000 rpm for a time period in a range of 60 to 180 minutes. In some embodiments, the aqueous slurry of the silane modified clay is stirred at 3500 rpm for 90 minutes.

In the next step, pH of the aqueous slurry of the silane modified clay is adjusted to about 9-11. In an embodiment, the pH of the aqueous slurry of the silane modified clay is adjusted to 10. The pH is adjusted by adding the base selected from the group consisting of sodium hydroxide, potassium hydroxide, calcium hydroxide and their combinations. In some embodiments, the base is sodium hydroxide.

In the next step, the one or more essential oils or extract thereof is blended with the aqueous slurry of the silane modified clay. In an embodiment, the one or more essential oils or extract thereof is blended with the aqueous slurry of the silane modified clay at a temperature in a range of 25-35° C. under continuous stirring. In some embodiments, the one or more essential oils or extract thereof is blended with the aqueous slurry of the silane modified clay at 30° C. with stirring at a stirring rate of 2000 to 4000 rpm.

In an embodiment, the one or more essential oils or the extract thereof is mixed with a solvent prior to blending with the aqueous slurry of the silane modified clay. The addition of the solvent to the one or more essential oils or extract thereof assists in the adsorption thereof into the pores of the silane modified clay. In an embodiment, the solvent is selected from the group consisting of ethanol, isopropanol, butanol and combinations thereof. In some embodiments, the solvent is ethanol.

In an embodiment, the one or more essential oils or the extract thereof is added dropwise to the aqueous slurry of the silane modified clay at a rate in the range of 0.025 ml/sec. In an embodiment, after the addition of the one or more essential oils or the extract thereof, the aqueous slurry of the silane modified clay is stirred at a stirring rate of 2000-4000 rpm, for a time period in the range of 60-180 min.

In the next step, the mixture of the one or more essential oils or an extract thereof and the silane modified clay is subjected to drying. Any suitable drying method may be used for drying the obtained aqueous slurry of the silane modified clay. Examples of suitable method include but are not limited to spray drying, hot air oven drying or tray drying. In an embodiment, the obtained aqueous slurry of the silane modified clay is dried in a hot air oven. In an embodiment, the obtained aqueous slurry of the silane modified clay is dried in the oven with air circulation at a temperature in the range of 50-55° C. such that the composition comprising one or more essential oils or an extract thereof homogenized with the silane modified clay is obtained.

The disclosed essential oil composition is effective against *Escherichia coli, Salmonella* spp, *Agrobacterium tumefaciens, Xanthomonas campestris, Pseudomonas syringae, Erwinia amylovora, Ralstonia solanacearum, Aspergillus* spp., *Phytophthora infestans, Fusarium oxysporum, Botrytis cinerea, Puccinia* spp., *Sclerotinia* spp., Taphrina deformans and *Rhizoctonia solani.*

The invention will now be described with respect to the following examples which do not limit the disclosed method in any way and only exemplify the claimed method. It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

EXAMPLES

Example 1: Preparation of Essential Oil Composition in Accordance with an Exemplary Embodiment Composition: The composition of the extracts of essential oils (EO1) used in the exemplary composition of the present disclosure and their quantity are listed in Table 1, below:

TABLE 1

Composition of extracts of essential oils (EO1) in essential oil composition

| S. No. | Component | Quantity (in w/w %) |
|---|---|---|
| 1. | Eugenol | 50 |
| 2. | Cinnamaldehyde | 20 |
| 3. | D-limonene | 15 |
| 4. | Linalool | 5 |
| 5. | Beta-caryophyllene | 5 |
| 6. | Cardanol acetate | 5 |

Purification of clay: 100 grams of bentonite clay was taken and heated in a hot air oven at 250° C. for 4 hours. To the heated bentonite clay, 500 ml of distilled water was added with stirring at 2000 rpm for 30 minutes to obtain a suspension of the bentonite clay. The obtained suspension of bentonite clay was allowed to separate into a sediment of bentonite clay and an aqueous layer. Post separation, the aqueous layer was decanted, and 50 ml of hydrochloric acid was added to the sediment of bentonite clay at 27° C. with stirring at 2500 rpm for 60 minutes. The obtained sediment of clay was dried in the hot air oven at 200° C. for 6 hours to obtain purified bentonite clay.

Preparation of silane modified clay: 100 grams of the purified bentonite clay and 250 ml of water was mixed in a vessel to prepare an aqueous dispersion of clay. To the prepared aqueous dispersion of clay, 2 grams of (3-Aminopropyl) triethoxysilane was added at a temperature of 50° C. to obtain silane modified clay. The obtained silane modified clay was stirred for 90 minutes at a stirring rate of 3500 rpm. After stirring, the obtained silane modified clay was washed with water at least three times to remove excess of (3-Aminopropyl) triethoxysilane. Post washing, the silane modified clay was dried at 100° C. in a hot air oven to remove excess water.

Preparation of essential oil composition: To 100 grams of the dried silane modified clay, 250 ml of distilled water was added to prepare an aqueous slurry of silane modified clay. This aqueous slurry was stirred for 60 minutes at a stirring rate of 3500 rpm, followed by addition of 20-30 ml of sodium hydroxide till the pH of the aqueous slurry of the silane modified clay is 10. After maintaining the pH of the aqueous slurry of the silane modified clay to the desired value, a mixture of the extract of essential oils as mentioned above in table 1 was taken and mixed with 10 ml of ethanol. This mixture was added dropwise to the aqueous slurry dropwise at a rate of 25 μl/sec. After the completion of the addition of mixture of the extract of essential oils to the aqueous slurry of the silane modified clay, the mixture of the slurry was stirred at 4000 rpm for 20 minutes. The mixture of the slurry was poured in stainless-steel trays and dried in the hot air oven with an air circulation at 50° C. to obtain essential oil composition comprising the extract of essential oils microencapsulated with the silane modified clay. A detailed characterization of the prepared essential oil composition was carried out by SEM and TEM.

Figure 1B:
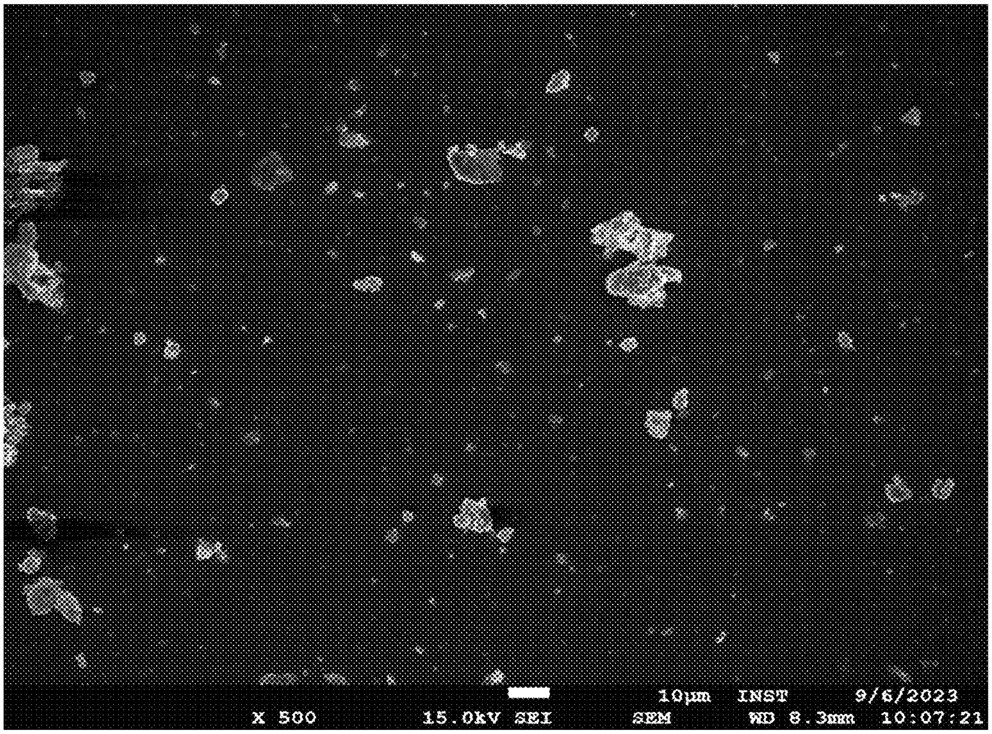
FIG. 1B depicts the SEM image of the essential oil composition in accordance with an embodiment of the present disclosure.
Figure 1C:
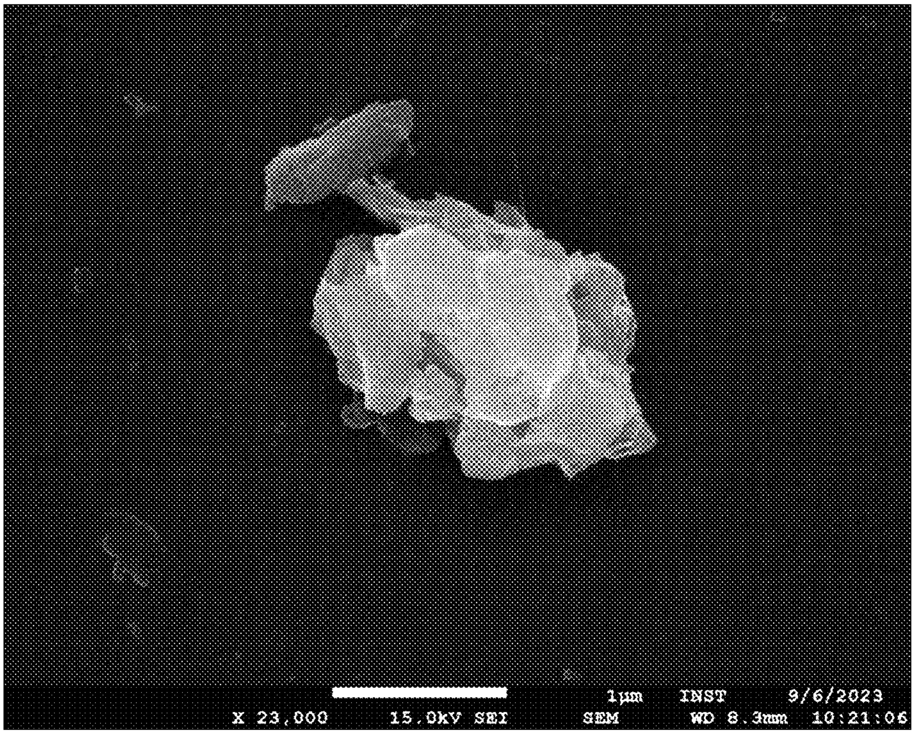
FIG. 1C depicts the SEM image of the essential oil composition in accordance with an embodiment of the present disclosure.
Figure 2A:
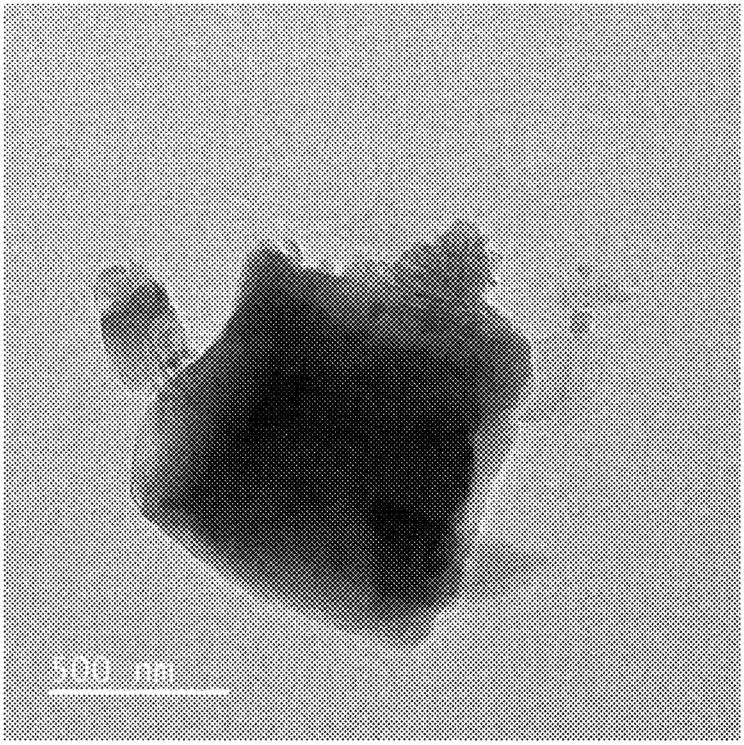
FIG. 2A depicts the Transmission Electron Microscope (TEM) image of bentonite clay in accordance with an embodiment of the present disclosure.
Figure 2B:
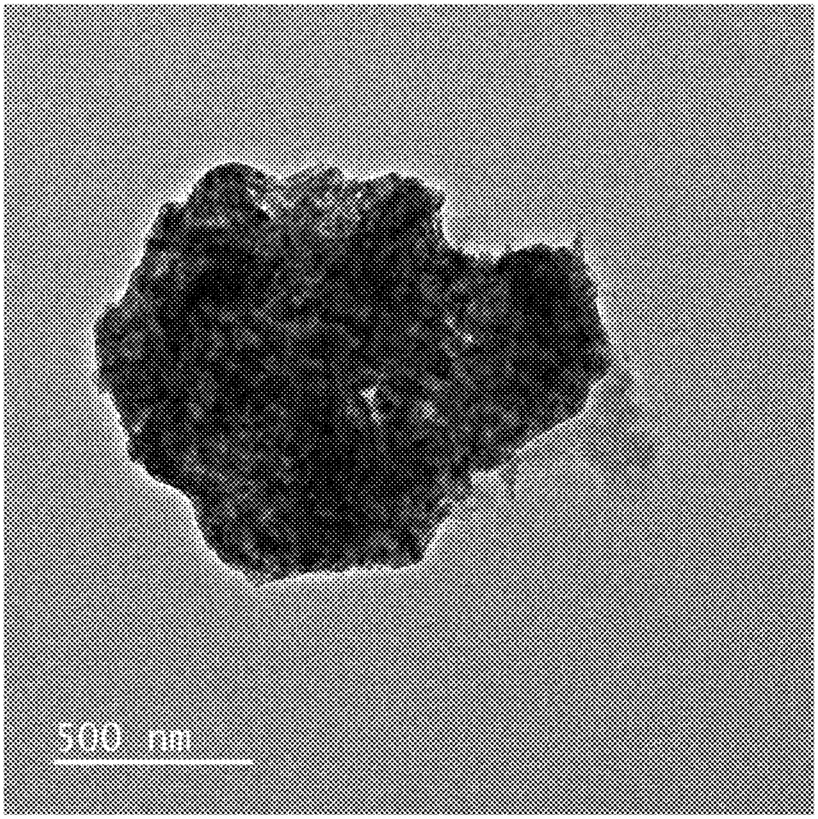
FIG. 2B depicts the TEM image of the essential oil composition in accordance with an embodiment of the present disclosure.

Results and Observation: FIGS. 1A, 1B, and 1C depict the SEM of the bentonite clay, the purified bentonite clay, and the essential oil composition prepared in Example 1. FIGS. 2A, and 2B depict the TEM of the bentonite clay, the purified bentonite clay, and the essential oil composition prepared in Example 1.

It was observed from SEM images that the purified bentonite clay exhibited an average particle size in the range of 1 to 10 μm. The average particle size of the silane modified bentonite was 0.1 to 0.5 μm. The SEM images of the essential oil composition showed formation of microspheres of essential oils encapsulated with processed bentonite clay. The average particle size of the microspheres of the essential oil composition was in the range of 0.5 to 5 μm.

TEM images showed formation of minuscule oil droplets within the microencapsulated silane modified bentonite clay.

Example 2: Comparison of Encapsulated Essential Oil Composition Vis-à-Vis a Mixture of Essential Oils The antimicrobial activity of the essential oil composition (EO1) of Example 1 was compared with that of a mixture of extracts of essential oils (MX1) comprising eugenol, cinnamaldehyde, D-limonene, Linalool, Beta-caryophyllene, cardanol acetate and a combination (CXI) of raw bentonite clay and the mixture of extracts of essential oils (MX1) comprising eugenol, cinnamaldehyde, D-limonene, Linalool, Beta-caryophyllene, and cardanol acetate. Each of the compositions comprise same composition of the extract of essential oils, as indicated in Table 1, above. The antimicrobial effect of EO1, MX1 and CXI was tested using standard zone of inhibition (ZOI) test for a time-period of 45 days. Table 2 shows the results of ZOI results against *Salmonella* spp. obtained using EO1, MX1 and CXI.

Figure 3:
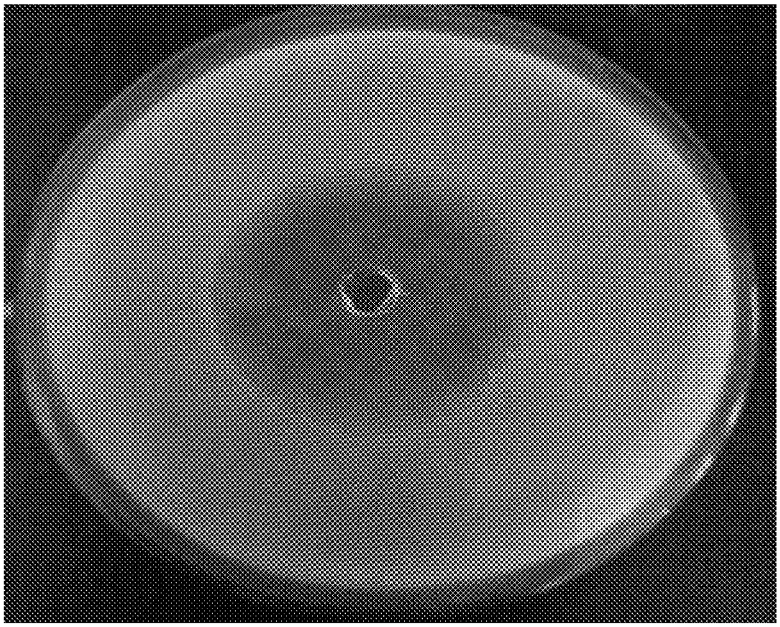
FIG. 3 depicts the inhibitory activity of the mixture of the essential oils against the *Salmonella* Spp.

FIG. 3 depicts the inhibitory activity of the MXI against the *Salmonella* Spp.

Figure 4A:
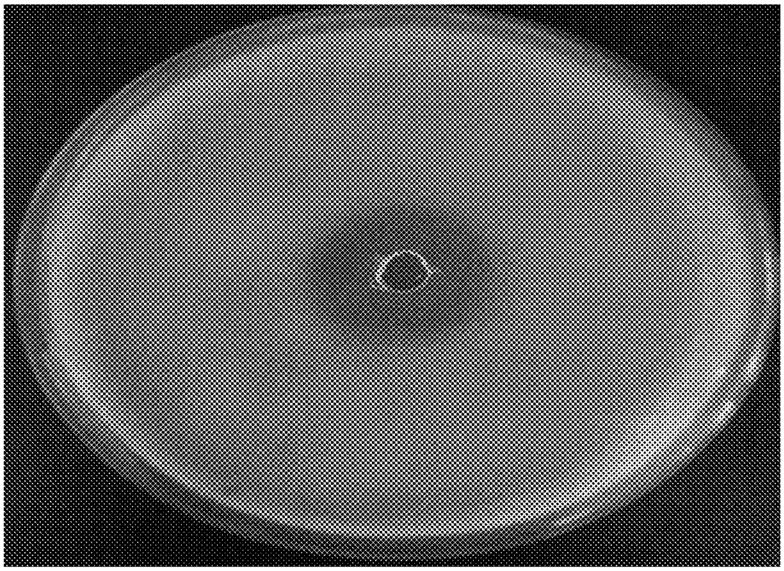
FIGS. 4A, 4B and 4C depict the inhibitory activity of the essential oil composition (EOI) prepared in accordance with an embodiment of the present disclosure, on day 1, 15 and 30 respectively against the *Salmonella* Spp.
Figure 4B:
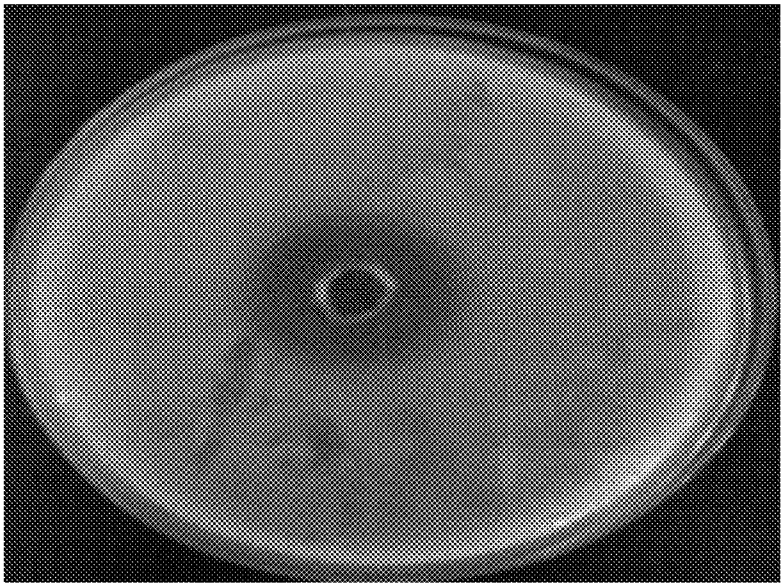
Figure 4C:
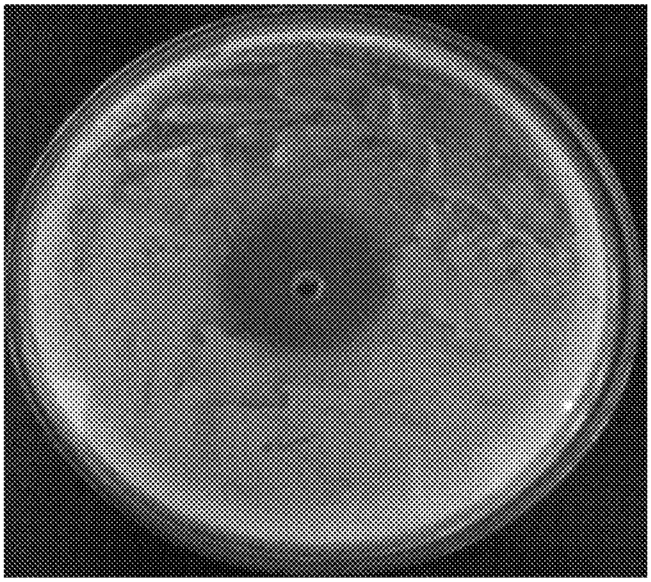

FIGS. 4A, 4B and 4C depict the inhibitory activity of the essential oil composition (EOI) prepared in accordance with an embodiment of the present disclosure, on day 1, 15 and 30 respectively against the *Salmonella* Spp.

Figure 5A:
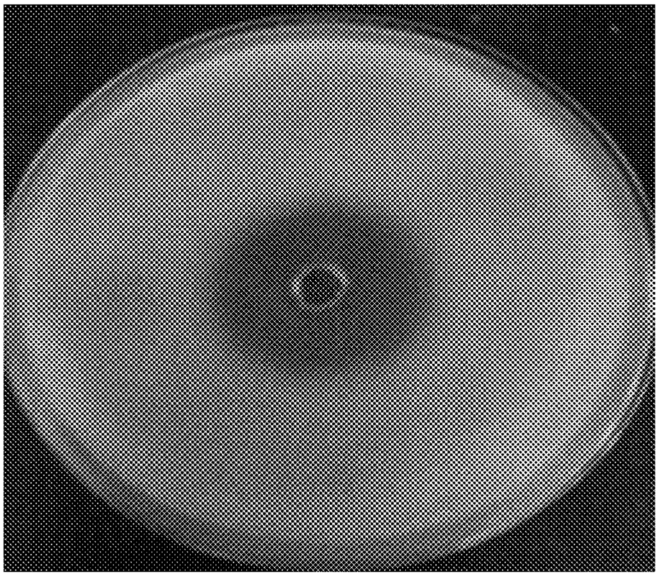
FIGS. 5A, 5B and 5C depict the inhibitory activity of a combination (CXI) of raw bentonite clay and the mixture of essential oils (MX1) comprising eugenol, cinnamaldehyde, D-limonene, linalool, beta-caryophyllene, and cardanol acetate on day 1, 15 and 30 against the *Salmonella* Spp.
Figure 5B:
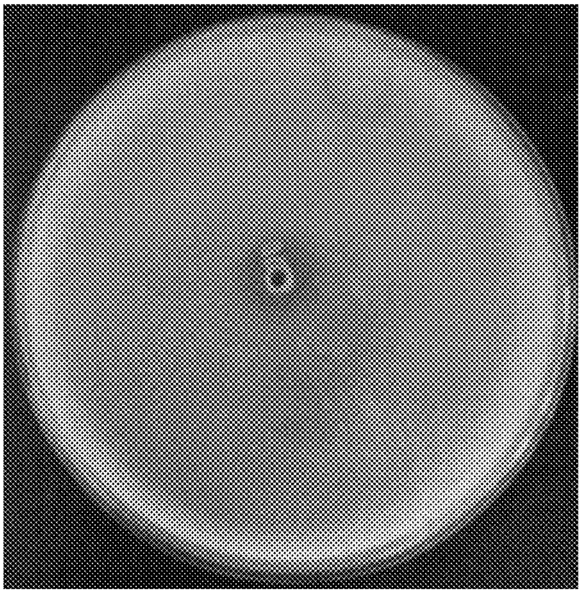
Figure 5C:
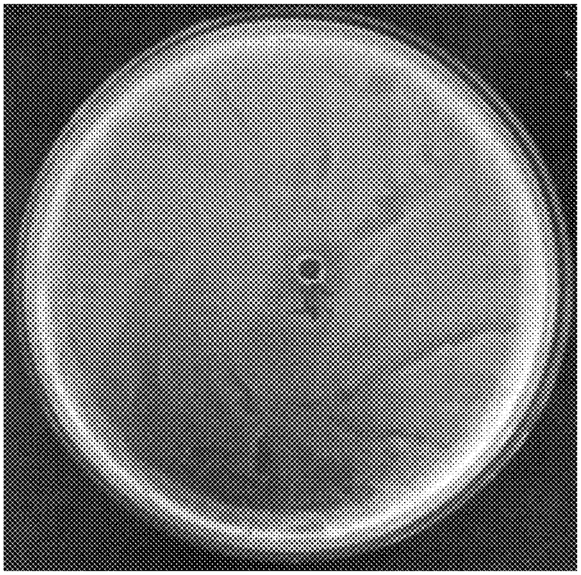

FIGS. 5A, 5B and 5C depict the inhibitory activity of a combination (CXI) of raw bentonite clay and the mixture of essential oils (MX1) comprising eugenol, cinnamaldehyde, D-limonene, linalool, beta-caryophyllene, and cardanol acetate on day 1, 15 and 30 against the *Salmonella* Spp.

TABLE 2

Comparison of ZOI of EO1, CXI, and MX1

| S. No. | Days | Zone of inhibition (mm) EO1 | CXI | MXI |
|---|---|---|---|---|
| 1 | 0 | 25 | 28 | 35 |
| 2 | 15 | 23 | 7 | 0 |
| 3 | 30 | 19 | 0 | 0 |
| 4 | 45 | 15 | 0 | 0 |

It was observed that the disclosed essential oil composition exhibits higher ZOI for a prolonged period of time as compared to the mixture of essential oils, as well as the combination of essential oils with the bentonite clay.

Example 3: Preparation of Essential Oil Composition EO2 in Accordance with an Exemplary Embodiment Composition: The extracts of essential oils used in the exemplary composition of the present disclosure and their quantity are listed in Table 3, below:

TABLE 3

Composition of extracts of essential oils (EO2) in essential oil composition

| S. No. | Component | Quantity (in w/w %) |
|---|---|---|
| 1. | Eugenol | 40 |
| 2. | Cinnamaldehyde | 20 |
| 3. | D-limonene | 20 |
| 4. | Linalool | 10 |
| 5. | Beta-caryophyllene | 5 |
| 6. | Cardanol acetate | 5 |

Purification of clay: 100 grams of bentonite clay was taken and heated in a hot air oven at 250° C. for 4 hours. To the heated bentonite clay, 500 ml of distilled water was added with stirring at 2000 rpm for 30 minutes to obtain a suspension of the bentonite clay. The obtained suspension of bentonite clay was allowed to separate into a sediment of bentonite clay and an aqueous layer. Post separation, the aqueous layer was decanted, and 50 ml of hydrochloric acid was added to the sediment of bentonite clay at 27° C. with stirring at 2500 rpm for 60 minutes. The obtained sediment of clay was dried in the hot air oven at 200° C. for 6 hours to obtain purified bentonite clay.

Preparation of silane modified clay: 100 grams of the purified bentonite clay and 250 ml of water was mixed in a vessel to prepare an aqueous dispersion of clay. To the prepared aqueous dispersion of clay, 2 grams of (3-Aminopropyl) triethoxysilane was added at a temperature of 50° C. to obtain silane modified clay. The obtained silane modified clay was stirred for 90 minutes at a stirring rate of 3500 rpm. After stirring, the obtained silane modified clay was washed with water at least three times to remove excess of (3-Aminopropyl) triethoxysilane. Post washing, the silane modified clay was dried at 100° C. in a hot air oven to remove excess water.

Preparation of essential oil composition: To 100 grams of the dried silane modified clay, 250 ml of distilled water was added to prepare an aqueous slurry of silane modified clay. This aqueous slurry was stirred for 60 minutes at a stirring rate of 3500 rpm, followed by addition of 20-30 ml of sodium hydroxide till the pH of the aqueous slurry of the silane modified clay is 10. After maintaining the pH of the aqueous slurry of the silane modified clay to the desired value, a mixture of the extract of essential oils as mentioned above in table 3 was taken and mixed with 10 ml of ethanol. This mixture was added dropwise to the aqueous slurry dropwise at a rate of 25 μl/sec. After the completion of the addition of mixture of the extract of essential oils to the aqueous slurry of the silane modified clay, the mixture of the slurry was stirred at 4000 rpm for 20 minutes. The mixture of the slurry was poured in stainless-steel trays and dried in the hot air oven with an air circulation at 50° C. to obtain essential oil composition comprising the extract of essential oils microencapsulated with the silane modified clay.

Example 4: Comparison of Effect of Encapsulated Essential Oil Composition (EO2) of Example 3 Vis-à-Vis a Mixture of Essential Oils The antimicrobial activity of the essential oil composition (EO2) of Example 3 was compared with that of a mixture of extracts of essential oils (MX1) comprising eugenol, cinnamaldehyde, D-limonene, Linalool, Beta-caryophyllene, cardanol acetate and a combination (CXI) of raw bentonite clay and the mixture of extracts of essential oils (MX1) comprising eugenol, cinnamaldehyde, D-limonene, Linalool, Beta-caryophyllene, and cardanol acetate. Each of the compositions comprise same composition of the extract of essential oils, as indicated in Table 3, above. The antimicrobial effect of EO2, MX1 and CXI was tested using standard zone of inhibition (ZOI) test for a time-period of 30 days. Table 4 shows the results of ZOI results against *Salmonella* spp. obtained using EO2, MX1 and CXI.

TABLE 4

Comparison of ZOI of EO2, CXI, and MX1

| S. | | Zone of inhibition (mm) | | |
|---|---|---|---|---|
| No. | Days | EO2 | CXI | MXI |
| 1 | 0 | 22 | 24 | 31 |
| 2 | 15 | 20 | 7 | 0 |
| 3 | 30 | 13 | 0 | 0 |

It was observed that the disclosed essential oil composition exhibits higher ZOI for a prolonged period of time as compared to the mixture of essential oils, as well as the combination of essential oils with the bentonite clay.

Example 5: Preparation of Essential Oil Composition EO3 in Accordance with an Exemplary Embodiment Composition: The extracts of essential oils used in the exemplary composition of the present disclosure and their quantity are listed in Table 5, below:

TABLE 5

Composition of extracts of essential oils in essential oil composition

| S. No. | Component | Quantity (in w/w %) |
|---|---|---|
| 1. | Eugenol | 60 |
| 2. | Cinnamaldehyde | 10 |
| 3. | D-limonene | 15 |
| 4. | Linalool | 5 |
| 5. | Beta-caryophyllene | 5 |
| 6. | Cardanol acetate | 5 |

Purification of clay: 100 grams of bentonite clay was taken and heated in a hot air oven at 250° C. for 4 hours. To the heated bentonite clay, 500 ml of distilled water was added with stirring at 2000 rpm for 30 minutes to obtain a suspension of the bentonite clay. The obtained suspension of bentonite clay was allowed to separate into a sediment of bentonite clay and an aqueous layer. Post separation, the aqueous layer was decanted, and 50 ml of hydrochloric acid was added to the sediment of bentonite clay at 27° C. with stirring at 2500 rpm for 60 minutes. The obtained sediment of clay was dried in the hot air oven at 200° C. for 6 hours to obtain purified bentonite clay.

Preparation of silane modified clay: 100 grams of the purified bentonite clay and 250 ml of water was mixed in a vessel to prepare an aqueous dispersion of clay. To the prepared aqueous dispersion of clay, 2 grams of (3-Aminopropyl) triethoxysilane was added at a temperature of 50° C. to obtain silane modified clay. The obtained silane modified clay was stirred for 90 minutes at a stirring rate of 3500 rpm. After stirring, the obtained silane modified clay was washed with water at least three times to remove excess of (3-Aminopropyl) triethoxysilane. Post washing, the silane modified clay was dried at 100° C. in a hot air oven to remove excess water.

Preparation of essential oil composition: To 100 grams of the dried silane modified clay, 250 ml of distilled water was added to prepare an aqueous slurry of silane modified clay. This aqueous slurry was stirred for 60 minutes at a stirring rate of 3500 rpm, followed by addition of 20-30 ml of sodium hydroxide till the pH of the aqueous slurry of the silane modified clay is 10. After maintaining the pH of the aqueous slurry of the silane modified clay to the desired value, a mixture of the extract of essential oils as mentioned above in table 5 was taken and mixed with 10 ml of ethanol. This mixture was added dropwise to the aqueous slurry dropwise at a rate of 25 μl/sec. After the completion of the addition of mixture of the extract of essential oils to the aqueous slurry of the silane modified clay, the mixture of the slurry was stirred at 4000 rpm for 20 minutes. The mixture of the slurry was poured in stainless-steel trays and dried in the hot air oven with an air circulation at 50° C. to obtain essential oil composition comprising the extract of essential oils microencapsulated with the silane modified clay.

Example 6: Comparison of Effect of Encapsulated Essential Oil Composition of Example 5 Vis-à-Vis a Mixture of Essential Oils The antimicrobial activity of the essential oil composition (EO3) of Example 5 was compared with that of a mixture of extracts of essential oils (MX1) comprising eugenol, cinnamaldehyde, D-limonene, Linalool, Beta-caryophyllene, cardanol acetate and a combination (CXI) of raw bentonite clay and the mixture of extracts of essential oils (MX1) comprising eugenol, cinnamaldehyde, D-limonene, Linalool, Beta-caryophyllene, and cardanol acetate. Each of the compositions comprise same composition of the extract of essential oils, as indicated in Table 2, above. The antimicrobial effect of EO3, MX1 and CXI was tested using standard zone of inhibition (ZOI) test for a time-period of 30 days. Table 6 shows the results of ZOI results against *Salmonella* spp. obtained using EO3, MX1 and CXI.

TABLE 6

Comparison of ZOI of EO3, CXI, and MX1

| S. | | Zone of inhibition (mm) | | |
|---|---|---|---|---|
| No. | Days | EO3 | CXI | MXI |
| 1 | 0 | 25 | 29 | 35 |
| 2 | 15 | 24 | 7 | 0 |
| 3 | 30 | 20 | 0 | 0 |

It was observed that the disclosed essential oil composition exhibits higher ZOI for a prolonged period of time as compared to the mixture of essential oils, as well as the combination of essential oils with the bentonite clay.

Example 7: Preparation of Essential Oil Composition EO4 in Accordance with an Exemplary Embodiment Composition: The extracts of essential oils used in the exemplary composition of the present disclosure and their quantity are listed in Table 7, below:

TABLE 7

Composition of extracts of essential oils in essential oil composition

| S. No. | Component | Quantity (in w/w %) |
|---|---|---|
| 1. | Eugenol | 55 |
| 2. | Cinnamaldehyde | 10 |
| 3. | D-limonene | 10 |
| 4. | Linalool | 5 |
| 5. | Beta-caryophyllene | 10 |
| 6. | Cardanol acetate | 10 |

Purification of clay: 100 grams of bentonite clay was taken and heated in a hot air oven at 250° C. for 4 hours. To the heated bentonite clay, 500 ml of distilled water was added with stirring at 2000 rpm for 30 minutes to obtain a suspension of the bentonite clay. The obtained suspension of bentonite clay was allowed to separate into a sediment of bentonite clay and an aqueous layer. Post separation, the aqueous layer was decanted, and 50 ml of hydrochloric acid was added to the sediment of bentonite clay at 27° C. with stirring at 2500 rpm for 60 minutes. The obtained sediment of clay was dried in the hot air oven at 200° C. for 6 hours to obtain purified bentonite clay.

Preparation of silane modified clay: 100 grams of the purified bentonite clay and 250 ml of water was mixed in a vessel to prepare an aqueous dispersion of clay. To the prepared aqueous dispersion of clay, 2 grams of (3-Aminopropyl) triethoxysilane was added at a temperature of 50° C. to obtain silane modified clay. The obtained silane modified clay was stirred for 90 minutes at a stirring rate of 3500 rpm. After stirring, the obtained silane modified clay was washed with water at least three times to remove excess of (3-Aminopropyl) triethoxysilane. Post washing, the silane modified clay was dried at 100° C. in a hot air oven to remove excess water.

Preparation of essential oil composition: To 100 grams of the dried silane modified clay, 250 ml of distilled water was added to prepare an aqueous slurry of silane modified clay. This aqueous slurry was stirred for 60 minutes at a stirring rate of 3500 rpm, followed by addition of 20-30 ml of sodium hydroxide till the pH of the aqueous slurry of the silane modified clay is 10. After maintaining the pH of the aqueous slurry of the silane modified clay to the desired value, a mixture of the extract of essential oils as mentioned above in table 7 was taken and mixed with 10 ml of ethanol. This mixture was added dropwise to the aqueous slurry dropwise at a rate of 25 μl/sec. After the completion of the addition of mixture of the extract of essential oils to the aqueous slurry of the silane modified clay, the mixture of the slurry was stirred at 4000 rpm for 20 minutes. The mixture of the slurry was poured in stainless-steel trays and dried in the hot air oven with an air circulation at 50° C. to obtain essential oil composition comprising the extract of essential oils microencapsulated with the silane modified clay.

Example 8: Comparison of Effect of Encapsulated Essential Oil Composition E04 of Example 7 Vis-à-Vis a Mixture of Essential Oils The antimicrobial activity of the essential oil composition (EO4) of Example 5 was compared with that of a mixture of extracts of essential oils (MX1) comprising eugenol, cinnamaldehyde, D-limonene, Linalool, Beta-caryophyllene, cardanol acetate and a combination (CXI) of raw bentonite clay and the mixture of extracts of essential oils (MX1) comprising eugenol, cinnamaldehyde, D-limonene, Linalool, Beta-caryophyllene, and cardanol acetate. Each of the compositions comprise same composition of the extract of essential oils, as indicated in Table 7, above. The antimicrobial effect of EO4, MX1 and CXI was tested using standard zone of inhibition (ZOI) test for a time-period of 30 days. Table 8 shows the results of ZOI results against *Salmonella* spp. obtained using EO4, MX1 and CXI.

TABLE 8

Comparison of ZOI of EO4, CXI, and MX1

| S. | | Zone of inhibition (mm) | | |
|---|---|---|---|---|
| No. | Days | EO4 | CXI | MXI |
| 1 | 0 | 25 | 28 | 36 |
| 2 | 15 | 22 | 7 | 0 |
| 3 | 30 | 20 | 0 | 0 |

It was observed that the disclosed essential oil composition exhibits higher ZOI for a prolonged period of time as compared to the mixture of essential oils, as well as the combination of essential oils with the bentonite clay.

Example 9: Preparation of Essential Oil Composition EO5 in Accordance with an Exemplary Embodiment Composition: The extracts of essential oils used in the exemplary composition of the present disclosure and their quantity are listed in Table 9, below:

TABLE 9

Composition of extracts of essential oils in essential oil composition

| S. No. | Component | Quantity (in w/w %) |
|---|---|---|
| 1. | Eugenol | 45 |
| 2. | Cinnamaldehyde | 15 |
| 3. | D-limonene | 20 |
| 4. | Linalool | 10 |
| 5. | Beta-caryophyllene | 5 |
| 6. | Cardanol acetate | 5 |

Purification of clay: 100 grams of bentonite clay was taken and heated in a hot air oven at 250° C. for 4 hours. To the heated bentonite clay, 500 ml of distilled water was added with stirring at 2000 rpm for 30 minutes to obtain a suspension of the bentonite clay. The obtained suspension of bentonite clay was allowed to separate into a sediment of bentonite clay and an aqueous layer. Post separation, the aqueous layer was decanted, and 50 ml of hydrochloric acid was added to the sediment of bentonite clay at 27° C. with stirring at 2500 rpm for 60 minutes. The obtained sediment of clay was dried in the hot air oven at 200° C. for 6 hours to obtain purified bentonite clay.

Preparation of silane modified clay: 100 grams of the purified bentonite clay and 250 ml of water was mixed in a vessel to prepare an aqueous dispersion of clay. To the prepared aqueous dispersion of clay, 2 grams of (3-Aminopropyl) triethoxysilane was added at a temperature of 50° C. to obtain silane modified clay. The obtained silane modified clay was stirred for 90 minutes at a stirring rate of 3500 rpm. After stirring, the obtained silane modified clay was washed with water at least three times to remove excess of (3-Aminopropyl) triethoxysilane. Post washing, the silane modified clay was dried at 100° C. in a hot air oven to remove excess water.

Preparation of essential oil composition: To 100 grams of the dried silane modified clay, 250 ml of distilled water was added to prepare an aqueous slurry of silane modified clay. This aqueous slurry was stirred for 60 minutes at a stirring rate of 3500 rpm, followed by addition of 20-30 ml of sodium hydroxide till the pH of the aqueous slurry of the silane modified clay is 10. After maintaining the pH of the aqueous slurry of the silane modified clay to the desired value, a mixture of the extract of essential oils as mentioned above in table 9 was taken and mixed with 10 ml of ethanol. This mixture was added dropwise to the aqueous slurry dropwise at a rate of 25 μl/sec. After the completion of the addition of mixture of the extract of essential oils to the aqueous slurry of the silane modified clay, the mixture of the slurry was stirred at 4000 rpm for 20 minutes. The mixture of the slurry was poured in stainless-steel trays and dried in the hot air oven with an air circulation at 50° C. to obtain essential oil composition comprising the extract of essential oils microencapsulated with the silane modified clay.

Example 10: Comparison of Effect of Encapsulated Essential Oil Composition of Example 9 Vis-à-Vis a Mixture of Essential Oils The antimicrobial activity of the essential oil composition (EO5) of Example 9 was compared with that of a mixture of extracts of essential oils (MX1) comprising eugenol, cinnamaldehyde, D-limonene, Linalool, Beta-caryophyllene, cardanol acetate and a combination (CXI) of raw bentonite clay and the mixture of extracts of essential oils (MX1) comprising eugenol, cinnamaldehyde, D-limonene, Linalool, Beta-caryophyllene, and cardanol acetate. Each of the compositions comprise same composition of the extract of essential oils, as indicated in Table 9, above. The antimicrobial effect of EO5, MX1 and CXI was tested using standard zone of inhibition (ZOI) test for a time-period of 30 days. Table 10 shows the results of ZOI results against *Salmonella* spp. obtained using EO5, MX1 and CXI.

TABLE 10

Comparison of ZOI of EO5, CXI, and MX1

| S. | | Zone of inhibition (mm) | | |
|---|---|---|---|---|
| No. | Days | EO5 | CXI | MXI |
| 1 | 0 | 22 | 24 | 32 |
| 2 | 15 | 20 | 7 | 0 |
| 3 | 30 | 17 | 0 | 0 |

It was observed that the disclosed essential oil composition exhibits higher ZOI for a prolonged period of time as compared to the mixture of essential oils, as well as the combination of essential oils with the bentonite clay.

Preparation of Essential Oil Composition EO-CD Using Cyclodextrin as an Encapsulation Material:

Preparation of cyclodextrin solution: 50 grams of β-cyclodextrin was taken and dissolved in 500 ml of distilled water to prepare β-cyclodextrin solution. The solution was heated at 50° C. until the β-cyclodextrin was completely dissolved in water.

Preparation of the essential oil composition: To the prepared β-cyclodextrin solution, 5 ml of mixture of the extract of essential oils as mentioned above in table 1 was added dropwise at a rate of 25 μl/sec under continuous stirring. After the completion of the addition of mixture of the extract of essential oils to the β-cyclodextrin solution, the obtained mixture was stirred at a stirring rate of 2500 rpm for 20 minutes. Post stirring, 500 ml of ethanol was added to the mixture, followed by the stirring of the mixture at 50° C. for 2 hours. The mixture was allowed to cool at room temperature to allow the formation of precipitate. The cooled mixture was filtered to separate the formed precipitate from the filtrate. The obtained filtrate was air-dried or freeze dried to obtain the essential oil composition comprising the extract of essential oils microencapsulated with the β-cyclodextrin.

Preparation of Essential Oil Composition EO_PVA Using Polyvinyl Alcohol (PVA) as an Encapsulation Material:

Preparation of PVA solution: 10 grams of PVA was taken and dissolved in 1 litre of distilled water to prepare PVA solution. The solution was heated at 85° C. under continuous stirring, until the PVA is completely dissolved in water. The obtained solution was allowed to cool at room temperature under constant stirring to avoid the formation of a film on the surface.

Preparation of the essential oil composition: To the prepared PVA solution, 10 ml of mixture of the extract of essential oils as mentioned above in table 1 was added dropwise at a rate of 25 μl/sec. After the completion of the addition of mixture of the extract of essential oils to the PVA solution, the obtained mixture was homogenized using an emulsifier or high shear mixer at 5000 rpm to form a stable oil in water emulsion. The obtained emulsion was poured into a mould to form a film. The formed film was freeze-dried, followed by standard lyophilization procedures to obtain the dried product. The obtained dried product was grinded using pulverizer to obtain the essential oil composition comprising the extract of essential oils microencapsulated with the β-cyclodextrin.

Preparation of Essential Oil Composition EO_CT Using Chitosan as an Encapsulation Material:

Preparation of chitosan solution: 2 grams of chitosan was taken and dissolved in 100 ml of 1% acetic acid solution. The solution was stirred at room temperature to completely dissolve the chitosan in the acetic acid solution.

Preparation of the essential oil solution: The mixture of the extract of essential oils as mentioned in table 1 was taken and mixed with 50 ml of ethanol to prepare an essential oil solution.

Preparation of the essential oil composition: To the prepared chitosan solution, 10 ml of the essential oil solution prepared above was added dropwise at a rate of 25 μl/see to form a mixture. After the completion of the addition of the essential oil solution to the chitosan solution, the obtained mixture was stirred at a stirring rate of 3000 rpm for 30 minutes. The obtained mixture was subjected to ultra-sonication (sonics, 750 W) assisted homogenization. Ultrasonication was performed under the following conditions-Pulse on-5 seconds, pulse-off-5 seconds for 30 minutes to form a stable emulsion.

After the preparation of emulsion, 0.5 grams of sodium tripolyphosphate was taken and dissolved in 100 ml of water to prepare 0.5% solution of sodium tripolyphosphate. The solution of sodium tripolyphosphate was added dropwise to the prepared emulsion under continuous stirring at a stirring rate of 4000 rpm for 2 hours to form microspheres of the essential oil composition comprising the extract of essential oils microencapsulated with chitosan. The obtained microspheres were separated from the solution by centrifugation, followed by washing with distilled water to remove any unreacted material. The dried microspheres of the essential oil composition comprising the extract of essential oils microencapsulated with chitosan is freeze dried to remove any remaining water.

Results and Observation: The percentage release of extract of essential oils from EO1, EO_CD, EO_PVA and EO_CT was compared over a period of 90 days. It was found that the essential oil compositions EO_CD, EO_PVA and EO_CT prepared using conventional encapsulating materials-cyclodextrin, PVA, and chitosan, respectively, did not show sustained release of the essential oils for a prolonged period of time as compared to the essential oil composition EO1 prepared using silane modified clay.

INDUSTRIAL APPLICATION

The disclosed essential oil composition finds application in food, cosmetic and pharmaceutical industry. Specifically, the disclosed essential oil composition finds application in preservatives and packaging materials for prolonging the shelf-life, quality, safety and integrity of perishable items by combating several environmental factors.

The disclosed composition exhibits slower and sustained release of essential oils and extracts thereof, as compared to known formulations comprising of essential oils. Further, the disclosed combination of essential oils in said essential oil composition provides a synergistic effect in terms of antioxidant and antimicrobial activity.

The disclosed composition when applied on fresh produce including leafy greens, microgreens, fruits and vegetables, increases their shelf life.

We claim:

1. An essential oil composition comprising:

one or more essential oils or an extract thereof homogenized with a silane modified clay, wherein the silane modified clay comprises a clay having hydroxyl group present thereon bonded with a silane coupling agent having a chemical formula I:

$$R—(CH_2)_n—(Si)—X_3$$

wherein:

R is selected from the group consisting of acryloxy, amine, or glycidyl ether;

n is 2-4; and each X is independently selected from the group consisting of $CH_3$, $C_2H_5$, $OCH_3$, and $OC_2H_5$;

wherein the clay is bentonite clay selected from the group consisting of sodium bentonite, calcium bentonite and combinations thereof; the bentonite clay is characterized by:

a) an average particle size in the range of 1 to 10 μm, b) a mass density in the range of 1.2 to 1.8 g/cm$^3$, and c) a cation exchange capacity (CEC) in the range of 60 to 150 meg/100 g.

2. The essential oil composition of claim 1, wherein the one or more essential oils or the extract thereof is homogenized with the silane modified clay in a w/w ratio ranging between 1:5 and 2:5.

3. The essential oil composition of claim 1, wherein the silane coupling agent is selected from the group consisting of (3-aminopropyl) triethoxysilane, epoxy silanes and methacryloxy propyl trimethoxy silane.

4. The essential oil composition of claim 1, wherein the silane coupling agent is (3-aminopropyl) triethoxysilane.

5. The essential oil composition of claim 1, wherein the one or more essential oils is selected from the group consisting of phenolic ethers, aromatic aldehyde and terpenes.

6. The essential oil composition of claim 1, wherein the extract of one or more essential oils is selected from the group consisting of eugenol, cinnamaldehyde, D-limonene, linalool, beta-caryophyllene, and cardanol acetate.

7. The essential oil composition of claim 6, wherein the extract of one or more essential oils comprises eugenol in a range of 40-60% w/w, cinnamaldehyde in a range of 10-20% w/w, D-limonene in a range of 5-20% w/w, linalool in a range of 5-20% w/w, beta-caryophyllene in a range of 5-20% w/w, and cardanol acetate in a range of 5-20% w/w.

8. The essential oil composition of claim 1, wherein the composition is in the form of microspheres having an average particle size ($D_{50}$) in the range of 0.5 to 5 μm.

9. A process for preparing an essential oil composition, the process comprising the steps of:

a. preparing an aqueous dispersion of clay;

b. adding a silane coupling agent to the aqueous dispersion of clay at a temperature in the range of 60-80° C. to obtain a silane modified clay;

c. preparing an aqueous slurry of the silane modified clay;

d. adjusting the pH of the aqueous slurry of the silane modified clay in the range of 9-11;

e. blending one or more essential oils or an extract thereof with the aqueous slurry of the silane modified clay to obtain a mixture of the one or more essential oils or an extract thereof and the silane modified clay; and f. drying the mixture of the one or more essential oils or an extract thereof and the silane modified clay obtained in step e) such that the composition comprising one or more essential oils or an extract thereof homogenized with the silane modified clay is obtained;

wherein the clay is bentonite clay selected from the group consisting of sodium bentonite, calcium bentonite and combinations thereof; the bentonite clay is characterized by:

a) an average particle size in the range of 1 to 10 μm, b) a mass density in the range of 1.2 to 1.8 g/cm$^3$, and c) a cation exchange capacity (CEC) in the range of 60 to 150 meg/100 g.

10. The process of claim 9, wherein the silane modified clay comprises a clay having hydroxyl group present thereon bonded with a silane coupling agent having a chemical formula I:

$$R—(CH_2)_n—(Si)—X_3$$

wherein

R is selected from the group consisting of acryloxy, amine, or glycidyl ether;

n is 2-4; and each X is independently selected from the group consisting of $CH_3$, $C_2H_5$, $OCH_3$, and $OCH_5$.

11. The process of claim 10, wherein the silane coupling agent is selected from the group consisting of (3-aminopropyl) triethoxysilane, epoxy silanes and methacryloxy propyl trimethoxy silane.

12. The process of claim 11, wherein the silane coupling agent is (3-aminopropyl) triethoxysilane.

13. The process of claim 9, wherein the silane coupling agent is added to the aqueous dispersion of clay in an amount in the range of 0.5-3% by weight.

14. The process of claim 9, wherein the one or more essential oils or the extract thereof is mixed with a solvent selected from the group consisting of ethanol, isopropanol, and butanol prior to blending with the aqueous slurry of the silane modified clay.

15. The process of claim 9, wherein the pH of the aqueous slurry is adjusted by addition of a base selected from the group consisting of sodium hydroxide, potassium hydroxide, calcium hydroxide and their combinations.

16. The process of claim 9, wherein the clay is subjected to a purification process, prior to the preparation of an aqueous dispersion of the clay in step a), the purification process comprising the steps of:

a. heating the clay at an elevated temperature in a range of 200 to 250° C. for a time period in the range of 3-5 hours;

b. mixing the heated clay with water to obtain a suspension of clay, followed by separation of the suspension of clay into a sediment of clay and an aqueous layer; and decanting the aqueous layer, followed by the addition of an acid to the sediment of clay at a temperature in a range of 25-30° C. with constant stirring to obtain purified clay.

* * * * *